United States Patent [19]

Riedmiller et al.

[11] 4,177,004

[45] Dec. 4, 1979

[54] COMBINED TURBINE SHROUD AND VANE SUPPORT STRUCTURE

[75] Inventors: Charles F. Riedmiller, Greenhills; Melvin Bobo, Cincinnati, both of Ohio

[73] Assignee: General Electric Company, Cincinnati, Ohio

[21] Appl. No.: 846,958

[22] Filed: Oct. 31, 1977

[51] Int. Cl.² ............................ F02C 7/12; F02C 7/20
[52] U.S. Cl. ...................................... 415/116; 415/136
[58] Field of Search ............... 415/115, 116, 117, 135, 415/136, 137

[56] References Cited

U.S. PATENT DOCUMENTS

| | | | |
|---|---|---|---|
| 2,859,934 | 11/1958 | Halford et al. | 415/137 |
| 3,628,880 | 12/1971 | Smuland | 415/115 |
| 3,742,705 | 7/1973 | Sifford | 415/117 |
| 3,966,354 | 6/1976 | Patterson | 415/116 |
| 3,986,720 | 10/1976 | Knudsen et al. | 415/136 |

Primary Examiner—Louis J. Casaregola
Attorney, Agent, or Firm—Dana F. Bigelow; Derek P. Lawrence

[57] ABSTRACT

A single turbomachine support structure provides both close tolerance radial positioning of a turbine shroud and close tolerance axial positioning of a vane. Radial movement of the vane without attendant radial movement of the shroud is accommodated by the use of surfaces designed to minimize constraint between the vane and the support structure. The linkage is further provided with cooling means to isolate thermal variations proximate the vane end thereof from the support structure end thereof.

8 Claims, 5 Drawing Figures

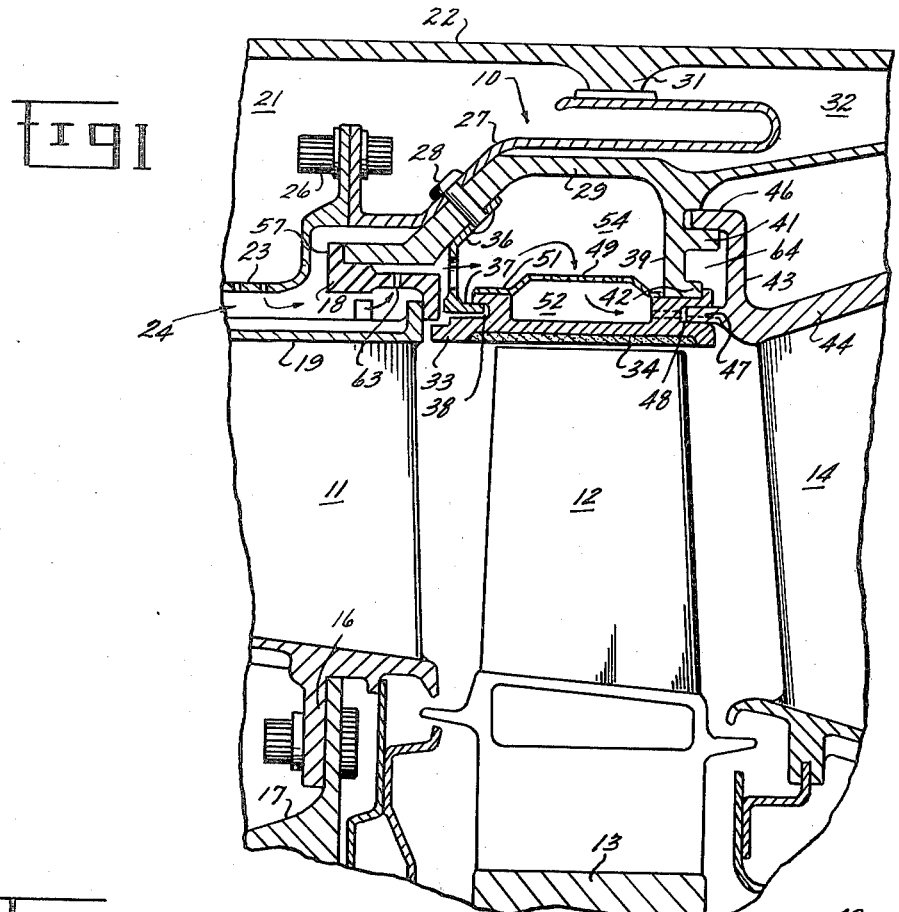
Fig 1
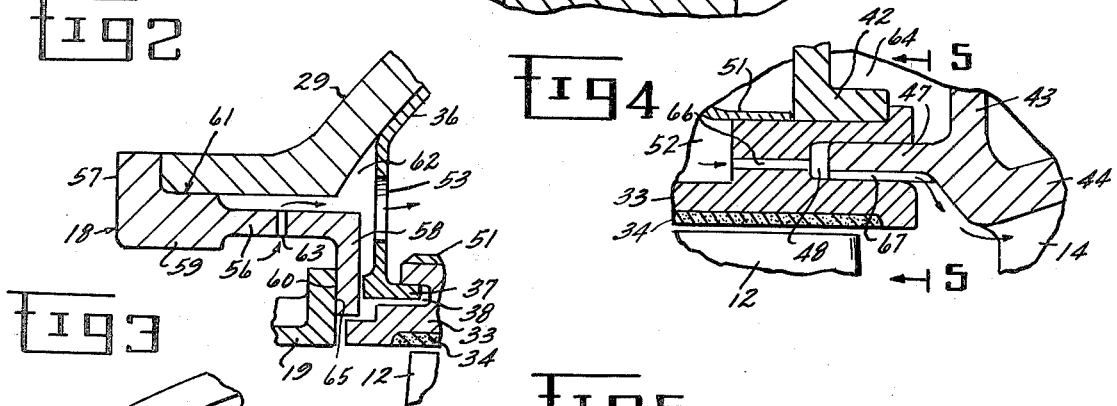
Fig 2
Fig 4
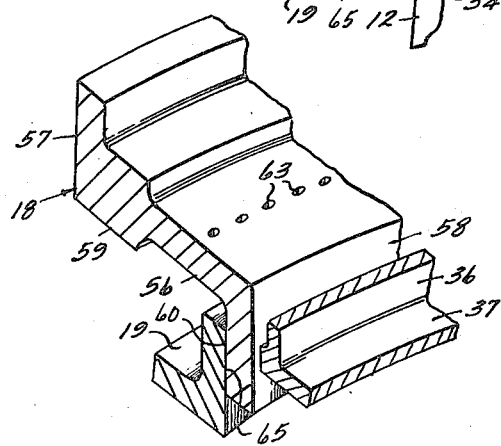
Fig 3
Fig 5

COMBINED TURBINE SHROUD AND VANE SUPPORT STRUCTURE

BACKGROUND OF THE INVENTION

This invention relates generally to gas turbine engines and, more particularly, to means for providing radial support for the turbine components of a gas turbine engine.

Turbine efficiency is largely determined by the ability to maintain a close clearance relationship between rotating blades and the surrounding stationary shrouds. Accordingly, in order to achieve and maintain good performance, it is necessary to have well maintained and repeatable close tolerances between those components. Wide clearances represent performance losses; and interference relationships, which may be caused by circumferentially nonuniform mechanical or thermal radial loads, tend to cause nonuniform wear of the shroud which subsequently may result in degraded performance. It is therefore desirable that the shroud be kept round and relatively isolated from such circumferentially nonuniform mechanical and thermal radial loads.

In an effort to limit the number of parts and simplify construction of a gas turbine engine, it is desirable to have a single support structure for supporting both the turbine shroud and the turbine vane immediately upstream thereof. For the reasons stated hereinabove, it is also desirable to have close tolerance radial positioning of the shroud. The vane, on the other hand, requires support only in the axial direction since the radial positioning thereof can be provided by other structure. However, because of the high axial loading, and especially at high speeds, any radial movement of the vane may be transmitted to the support structure and hence to the supported shroud to thereby effect its critical position. Nonuniformity in the circumferential shape of the shroud can thus result from nonuniform radial loads (as caused by either mechanical or thermal disturbances) which are transmitted from the vane to the shroud by way of the support structure.

It is therefore an object of the present invention to provide a turbine shroud support structure which maintains close radial tolerances and circumferential uniformity of the shroud.

Another object of the present invention is the provision for a support structure which provides both close tolerance radial positioning of a turbine shroud and axial positioning of an associated vane.

Yet another object of the present invention is the provision in an axial support structure for a turbine vane for preventing radial movements from being transmitted from the vane to the support structure.

Still another object of the present invention is the provision in an axial support structure for a vane for the isolation of certain portions of the support structure from thermal gradients which may occur at other portions thereof.

A further object of the present invention is the provision for a joint vane and shroud support structure which is economical to manufacture and effective in use.

These objects and other features and advantages become more readily apparent upon reference to the following description when taken in conjunction with the appended drawings.

SUMMARY OF THE INVENTION

Briefly, in accordance with one aspect of the invention, a nozzle support element is connected to the turbine shroud to provide close tolerance radial positioning therefor and is connected to the vane by a linkage which provides close tolerance axial positioning of the vane but permits radial movement thereof without attendant movement of the nozzle support element.

By another aspect of the invention, the flexible linkage comprises a ring which transmits both axial and radial loads toward the nozzle support element.

By yet another aspect of the invention, a plurality of circumferentially spaced holes are provided in the ring to provide fluid communication of cooling airflow through the ring to the outer surface of the shroud. In this way, the upstream end of the ring, which engages the nozzle support element is relatively isolated from the thermal variations which may exist at the downstream end of the ring adjacent the vane structure.

In the drawings as hereinafter described, a preferred embodiment is depicted; however, various other modifications and alternative constructions can be made thereto without departing from the true spirit and scope of the invention.

BRIEF DESCRIPTION OF THE DRAWINGS

FIG. 1 is a fragmented axial sectional view of the turbine and vane portion of a turbomachine in which the present invention is embodied.

FIG. 2 is an enlarged view of the support ring portion thereof.

FIG. 3 is a fragmented perspective view of the support ring portion thereof.

FIG. 4 is an enlarged view of the C-clamp/shroud portion of the FIG. 1 apparatus.

FIG. 5 is a sectional view thereof as seen along line 5—5 of FIG. 4.

DESCRIPTION OF THE PREFERRED EMBODIMENT

Referring to FIG. 1, the invention is shown generally at 10 as incorporated into the turbine section of a gas turbine engine. A first stage high pressure nozzle or vane 11 receives high pressure gas from the combustor and directs it onto the first stage high pressure turbine blades 12 which act to convert the thermal energy into kinetic energy by way of rotating the turbine disk 13 in a conventional manner. The first stage nozzle 11 is bolted at its inner band 16 to the first stage support 17 which provides both radial and axial support therefor as well as forming the inner flow path wall from the compressor rear frame to the nozzle. Axial support is also provided at the outer diameter of the vane 11 by way of a ring 18 which engages the rear side of the outer band 19. The hollow vanes 11 are cooled by compressor discharge air which enters the plenum 21, which is defined on its outer side by the compressor rear frame 22, and passes through an impingement plate 23 into a cavity 24 to enter the hollow blades and be discharged from a plurality of leading edge holes, gill holes and trailing edge slots in a manner well known in the art. The impingement plate 23 is secured by a plurality of bolts 26 to a seal 27 which in turn is secured by a plurality of bolts 28 to the stage 2 nozzle support 29. The seal 27 is an annular device which extends radially outward to engage a pad 31 on the compressor rear frame 22 so as to thereby isolate from the plenum 21 a rear plenum 32 which contains cooling air at a lower pressure and temperature from that of the plenum 21.

Located radially outward from the row of turbine blades 12 is a plurality of circumferentially spaced shroud segments 33. The shroud segments 33 are closely spaced from the turbine blades 12 to prevent leakage of the hot gases therebetween, and contain a section of material 34 directly opposite the turbine blade row so constituted as to allow occasional interference between the components without attendant wear of the turbine blades with unstable wear conditions prevailing. Support for the shroud segments 33 is provided on the forward end by a plurality of shroud support segments 36 which are connected to the stage 2 nozzle support 29 by the fasteners 28, and which extend radially inwardly to terminate in an axial flange 37 which fits into a forward groove 38 of the shroud to provide positive radial placement of the shroud. Support at the rear end of the shroud segment is provided by a rim 39, forming an integral part of and extending inwardly from the stage 2 nozzle support 29 and having outer and inner flanges 41 and 42. Also forming a part of the support structure is a C-clamp 43 which forms an integral part of and extends forwardly of the outer band 44 of the second stage nozzle 14. The rim inner flange 42 abuts the outer side of the shroud segments 33 and the C-clamp 43 fits into the combination such that its outer flange 46 closely engages the outer side of the rim outer flange 41, and its inner flange 47 fits into the rear groove 48 of the shroud segment. In this way the C-clamp 43 holds together the shroud 33 and the stage 2 nozzle support 29 such that the shroud 33 moves radially with the nozzle support 29. Similarly, the forward end of the shroud 33 is also radially positioned with the nozzle support 29 by virtue of the rigid shroud support segment 36. Thus, the radial position of the shroud 33 is dependent on the radial position of the stage 2 nozzle support 29 which, in turn, is dependent primarily on its temperature. Generally, at lower speeds the compressor discharge air is cooler and the nozzle support 29 will assume a relatively inward position whereas at higher speeds, when the compressor discharge air is at a higher temperature, the nozzle support 29 will assume a relatively outward position. For steady-state operation, this accommodates a similar characteristic in the operational position of the turbine blades so as to result in the maintenance of a minimum clearance between the two components.

The shroud segments 33 are cooled by way of cooling air which enters a plurality of small holes 49 in an impingement plate 51 which is secured to the outer side of the shroud segment 33 by way of brazing or the like. The air then enters the cavity 52 and impinges on the outer side of the shroud segment 33 to cause cooling thereof. The cooling air originates in the compressor and passes through a plurality of ports 53 in the shroud support segment 36 to enter the plenum 54 surrounding the baffle plate 51.

Referring now to FIGS. 2 and 3, the ring 18 comprises an axially aligned section 56 and forward and rear radial sections 57 and 58, respectively, to define a generally S-shaped cross section. The axially aligned section 56 has an enlarged section 59 whose outer periphery forms a pad 61 for closely engaging with an interference fit, the nozzle support 29 at its inner side. At the same time, the rear surface of the radial section 57 fits tightly against the front surface of the nozzle support 29. In this way, both the radial and the axial positions of the ring 18 are fixed by the support 29. The axial length of the section 56 is established so that the forward surface 60 of the rear radial section 58 abuts the rear side 65 of the vane outer band 19 so as to provide axial support therefor. It will, therefore, be recognized that as the vane 11 is loaded, the axial load will be transmitted to the nozzle support 29 by way of the enlarged section 58, the axial section 56 and the rear radial section 59 of the ring 18. At the same time, since the rear surface 65 of the vane outer band 19 is allowed to slide over the forward surface 60 of the rear radial section 58, the tendency for the radial loads to be transferred from the vane to the ring, and hence to the support 29, are minimized.

As can be seen by reference to FIG. 2, a cavity 62 is generally defined by the ring 18, the nozzle support 29, and the shroud support segments 36. Airflow communication is provided between this cavity 62 and the cavity 24 (FIG. 1) by a plurality of holes 63 which are properly sized to meter the air which flows by way of the ports 53 and the plenum 54 to cool the shroud structure. In addition, this row of holes as can be seen in FIG. 3 acts to isolate the upstream end of the ring axial section 56 from the thermal variations in the downstream end thereof. That is, since the ring rear radial section 58 is partially exposed to the hot gas stream, it is subject to temperature variation and to nonuniform circumferential temperature gradients. However, the row of holes 63 tends to form a barrier which prevents these temperatures from migrating to the enlarged section 59 of the ring and, hence, to the nozzle support 29 to cause nonuniformity in the circumference of the nozzle support 29 and of the shroud segments 33. It should be noted that the location of the holes 63 could be moved upstream or downstream on the ring, or could even be located in the nozzle support 29 itself.

Referring now to FIGS. 4 and 5, the C-clamp inner flange 47 is shown to be in a close-fit relationship with the shroud rear groove 48 so as to thereby assist in clamping the shroud segment 33 to the rim inner flange 42 so as to accurately control the radial position of the shroud 33. This close-fitting, interlocking relationship between the shroud and the rim inner flange 47 further prevents the hot flow path gases from flowing radially outward into the cavity 64 defined by the C-clamp 43 and the rim 39. Therefore, the cavity 64, the rim 39 and the support 29, as well as the adjacent rim outer flange 41, remain at a uniform cool temperature to maintain the vane and shroud in a substantially stable radial position. Since the C-clamp inner flange 47 is positioned close to the main gas stream, the transition cavities are essentially eliminated and hot gas recirculation is prevented so as to retain the motive energy within the hot gas flow path.

As can be seen by reference to FIG. 4, there is an area between the shroud segment 33 and the vane outer band 44 where the hot gas leaving the rotating stage is susceptible to stagnating against the leading edge of the nozzle. However, in order to prevent this, the air which is used to cool the shroud is further used to prevent or reduce this hot gas recirculation. A plurality of axially extending, circumferentially spaced holes 66 are formed in the shroud so as to fluidly connect the cavity 52 to the shroud rear groove 48. Further, a plurality of axially extending, circumferentially spaced slots 67 are formed in the inner edge of the C-clamp inner flange 47 so as to provide fluid communication between the shroud rear groove 48 and the leading edges of the stage 2 vanes. This structure allows the cooling air from the outer side of the shroud to flow through the holes 66, circumferentially around the shroud rear groove 48, through the slots 67, and into the area where the hot gas recirculation would otherwise occur. The cooling air then flows around the outer band leading edges to provide additional hot spot cooling and then re-enters the gas stream to do additional useful work. Proper alignment of the slots 67 with that region susceptible to airfoil stagnation, tends to flush out those regions and thereby maintain uniform temperatures and radial positions of the shroud and support structures.

Although the invention has been shown and described in terms of a preferred embodiment, it should be understood by those skilled in the art that various changes and omissions in the form and detail may be made therein without departing from the true spirit and scope of the invention.

Having thus described the invention, what is considered novel and desired to be secured by Letters Patent of the United States is:

1. In a turbomachine support structure of the type extending radially inward to provide radial support for the forward end of a turbine shroud and axial support for a vane outer band, an improved support arrangement comprising:
    (a) a shroud for placement in close radial relationship with a row of turbine blades;
    (b) a shroud support segment interconnecting said shroud and a surrounding support element, said support element having a forward flange extending independently forward from the point where said shroud support segment connects to said shroud support element;
    (c) a ring disposed between the vane outer band and said support element, said ring comprising an axial leg with its front end abutting said forward flange and a radial leg integrally attached to and extending radially inward from the rear end of said axial leg to frictionally engage and provide axial support to the vane outer band; and
    (d) means for introducing cooling air in the space partially defined by said ring and said shroud segment wherein said means comprises a plurality of circumferentially spaced holes formed in said ring for conducting the flow of cooling air therethrough.

2. The support structure as set forth in claim 1 and including means for supplying cooling air to the outer surface of said shroud.

3. A turbomachine support structure for jointly providing radial support to a turbine shroud and axial support to a turbine vane disposed forward of the shroud comprising:
    (a) a support element disposed radially outward from both the shroud and the vane;
    (b) a relatively rigid support segment interconnecting the shroud and the support element; and
    (c) a relatively flexible link interconnecting the turbine vane to said support element, such that radial movement of the vane will be accommodated by a flexing of said relatively flexible link rather than by movement of said support element, said flexible link having a plurality of holes formed therein for the passing of cooling air therethrough for cooling a portion thereof.

4. A turbomachine support structure as set forth in claim 3 wherein said flexible link includes a substantially axially extending portion.

5. A turbomachine support structure as set forth in claim 4 wherein said substantially axially extending portion comprises a ring having a radially extending leg attached to the rear end thereof.

6. A turbomachine support structure as set forth in claim 3 wherein said flexible link includes an integral extension of said support element.

7. The support structure, as set forth in claim 1, wherein said plurality of holes are formed in said axial leg.

8. The support structure, as set forth in claim 7, wherein said plurality of holes are formed near the midpoint of said axial leg.

* * * * *